Aug. 6, 1940.   H. M. ULLSTRAND   2,210,609
REFRIGERATION
Filed March 24, 1938   2 Sheets-Sheet 1

INVENTOR.
Hugo M. Ullstrand
BY El Fenander
his ATTORNEY.

Aug. 6, 1940.  H. M. ULLSTRAND  2,210,609
REFRIGERATION
Filed March 24, 1938   2 Sheets-Sheet 2
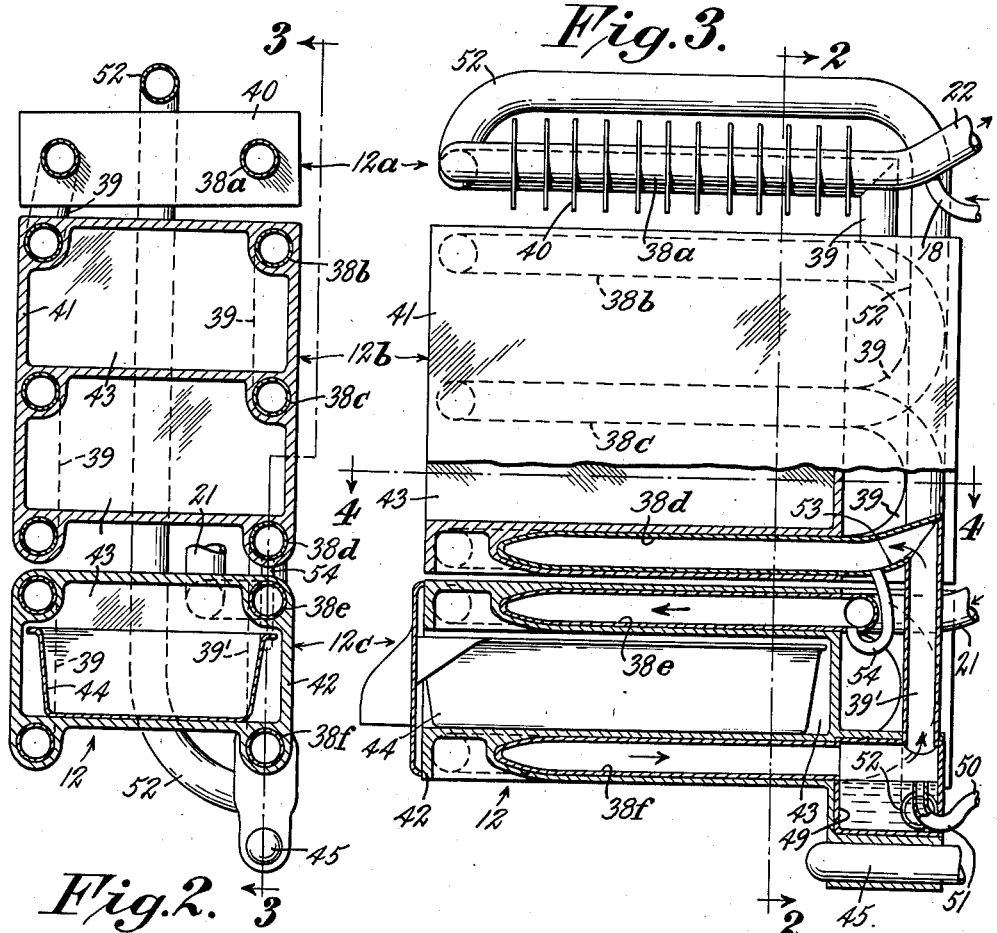
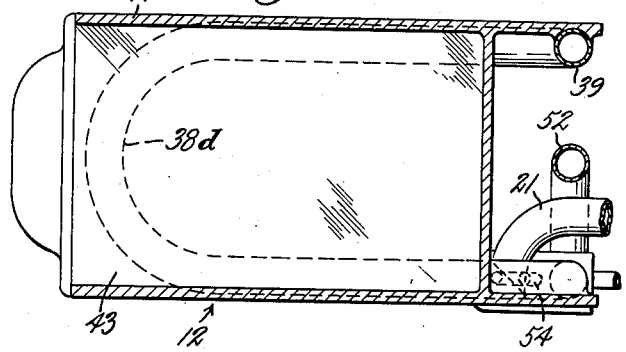
INVENTOR.
Hugo M. Ullstrand
BY  E. A. Fenander
his ATTORNEY.

Patented Aug. 6, 1940

2,210,609

UNITED STATES PATENT OFFICE 2,210,609

REFRIGERATION

Hugo M. Ullstrand, Evansville, Ind., assignor to Servel, Inc., New York, N. Y., a corporation of Delaware Application March 24, 1938, Serial No. 197,775

3 Claims. (Cl. 62—119.5)

My invention relates to refrigeration, and more particularly to a refrigeration system employing evaporation of refrigerant fluid in the presence of inert gas.

It is an object of the invention to improve the operation of refrigeration systems of this type, particularly to effect better use of cooling effect.

The above and other objects and advantages of the invention will become apparent from the following description and accompanying drawings forming a part of this specification, and of which:

Fig. 2 is an enlarged sectional view taken on line 2—2 of Fig. 1;

Fig. 3 is a view, partly in section, taken on line 3—3 of Fig. 2; and

Fig. 4 is a sectional view taken on line 4—4 of Fig. 3.

Figure 1:
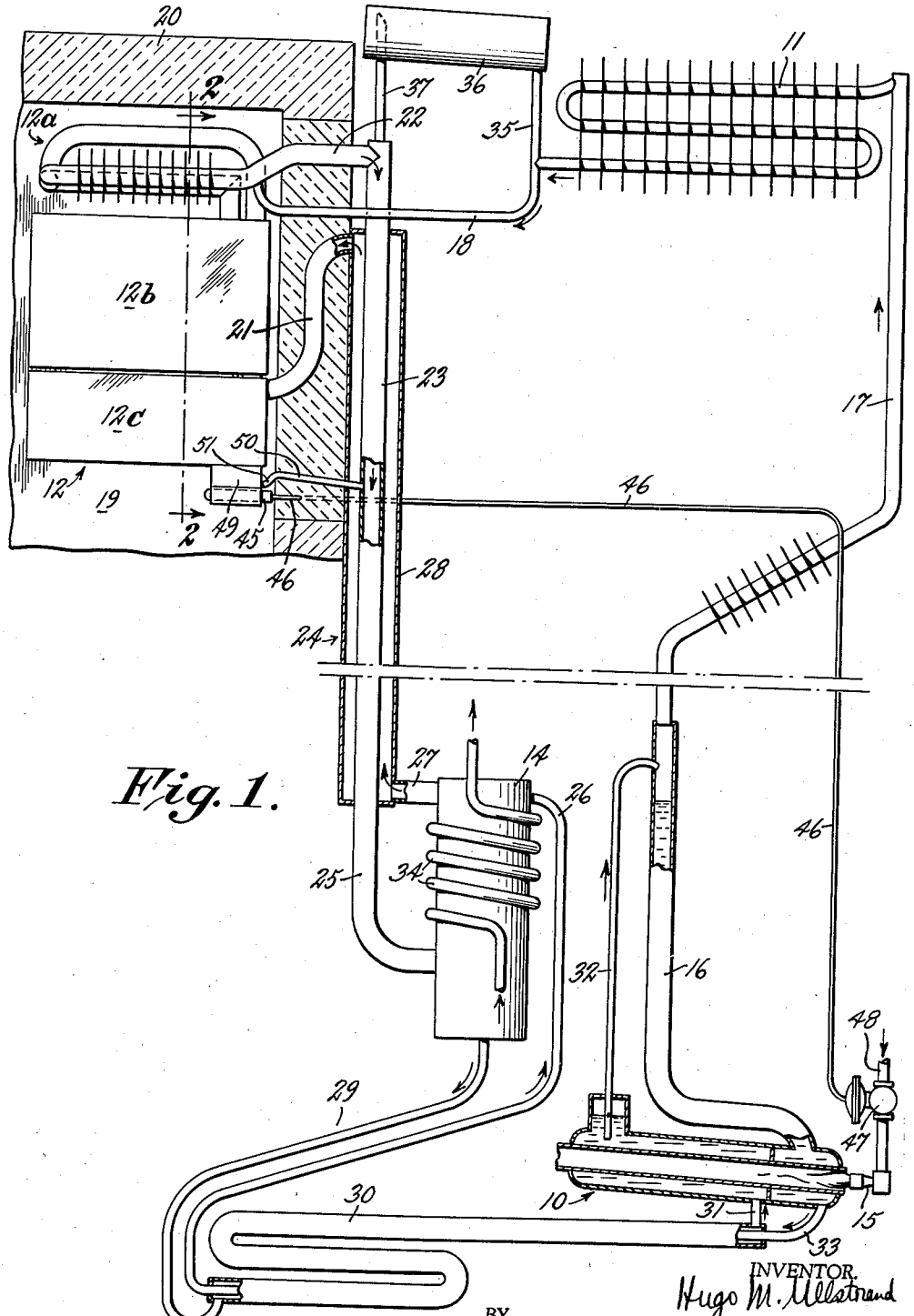
Fig. 1 illustrates more or less diagrammatically a refrigeration system embodying the invention.

In Fig. 1 I have shown my improvement embodied in an absorption refrigeration system of a type containing an auxiliary agent. Such a system includes a generator 10, condenser 11, an evaporator 12, and an absorber 14 which are interconnected in a manner well-known in the art and which will briefly be described hereinafter. The system contains a solution of refrigerant in absorption liquid, such as ammonia in water, for example, and also an auxiliary agent or inert gas, such as hydrogen.

The generator 10 is heated in any suitable manner, as by a gas burner 15, for example, whereby refrigerant vapor is expelled from solution in generator 10. The refrigerant vapor flows upwardly through a stand-pipe 16 and a conduit 17 into the condenser 11 where the liquid is condensed and flows through conduit 18 into evaporator 12.

The evaporator 12 is arranged in a space or compartment 19 formed by thermally insulated walls 20. Refrigerant fluid in evaporator 12 evaporates and diffuses into inert gas which enters through a conduit 21, thereby producing a refrigerating effect with consequent absorption of heat from the surroundings. The rich gas mixture of refrigerant vapor and inert gas formed in evaporator 12 flows from the upper part thereof through a conduit 22, the inner conduit 23 of a gas heat exchanger 24, and conduit 25 into the lower part of absorber 14.

In absorber 14 the rich gas mixture flows counter-current to downwardly flowing weak absorption liquid which enters through a conduit 26. The absorption liquid absorbs refrigerant vapor from the inert gas, and inert gas weak in refrigerant flows from absorber 14 through a conduit 27, outer conduit 28 of gas heat exchanger 14, and conduit 21 into the lower part of evaporator 12.

The circulation of gas in the gas circuit just described is due to the difference in specific weight of the columns of rich and weak gas in the inner and outer conduits 23 and 28, respectively, of the gas heat exchanger 24. Since the rich gas is heavier than the weak gas, a force is produced or developed for causing flow of rich gas toward absorber 14 and flow of weak gas toward evaporator 12.

Absorption liquid enriched in refrigerant flows from the lower part of absorber 14 through a conduit 29, outer passage of a liquid heat exchanger 30 and conduit 31 into generator 10. Liquid is raised in the generator by a thermosiphon tube 32 to a higher level than the upper end of conduit 26 and flows back to the generator through stand-pipe 16. The refrigerant vapor expelled out of solution in generator 10, together with refrigerant vapor entering through thermosiphon tube 32, flows upwardly through stand-pipe 16 and conduit 17 into condenser 11, as explained above.

The absorption liquid from which refrigerant has been expelled flows through generator 10 through conduit 33, inner passage of liquid heat exchanger 30, and conduit 26 to the upper part of absorber 14. This circulation of absorption liquid is due to raising of liquid by thermosiphon tube 32. Heat liberated with absorption of refrigerant vapor in absorber 14 is transferred to a suitable cooling medium which flows into a coil 34 arranged in thermal exchange relation with absorber 14.

The lower end of condenser 11 is connected by a conduit 35, vessel 36, and conduit 37 to the gas circuit, as at the upper part of gas heat exchanger 24, for example, so that any inert gas which may pass through the condenser can flow into the gas circuit. Refrigerant vapor not liquefied in the condenser flows through conduit 35 to displace inert gas in vessel 36 and force such gas through conduit 37 into the gas circuit. By forcing gas into the gas circuit in this manner, the total pressure in the system is raised whereby an adequate condensing pressure is obtained to insure condensation of refrigerant vapor in condenser 11.

The evaporator 12 comprises a plurality of sections 12a, 12b, and 12c, as shown most clearly in Figs. 2 and 3. The evaporator sections include a plurality of coils 38a to 38f inclusive which are U-shaped, as best shown in Fig. 4. The coils are closed at their forward ends and open at their rear ends. The coils are disposed one above the other and connected at their rear ends by vertical bends 39 and a vertical conduit connection 39'.

Referring to Fig. 2, the weak gas entering through conduit 21 flows through coil 38e which is next from the bottom, and then through the left-hand connecting bend 39 to the bottom coil 38f. From the bottom coil 38f, still referring to Fig. 2, inert gas flows through the right-hand conduit connection 39' to coil 38d located above coil 38e. The gas flows upwardly from coil 38d through coils 38c, 38b, and 38a and leaves the latter coil through conduit 22.

The inert gas flows through coils 38a to 38f in the presence of liquid refrigerant which enters through conduit 18. Since gas weak in refrigerant enters lower evaporator section 12c through conduit 21 and gas rich in refrigerant leaves upper evaporator section 12a through conduit 22, the gas in upper evaporator section 12a contains a greater amount of refrigerant vapor than the gas in intermediate section 12b, and the gas in intermediate section 12b contains a greater amount of refrigerant vapor than the gas in lower section 12c. The partial vapor pressure of refrigerant in the gas mixture is a gradient, so that the evaporating temperature of liquid refrigerant is also a gradient, the evaporating temperature of liquid refrigerant being lowest in lower evaporator section 12c.

The upper evaporator section 12a may be primarily employed for cooling space 19 and is provided with a plurality of heat transfer plates or fins 40 whereby a relatively extensive heat transfer surface is provided for cooling air in space 19. The intermediate and lower evaporator sections 12b and 12c may be provided with limited heat transfer surface and employed for freezing ice cubes and the like. The coils forming intermediate and lower evaporator sections 12b and 12c are embedded in shells 41 and 42, respectively, such shells having freezing compartments 43 to receive trays 44 adapted to contain water or other matter to be frozen.

The refrigeration system just described may be controlled by a thermal bulb 45 which is affected by a temperature condition of evaporator 12. As shown, the thermal bulb 45 is arranged in thermal exchange relation with the bottom part of lower evaporator section 12c and connected by a conduit 46 to a control device 47 which is connected in the fuel supply conduit 48 of burner 15. The thermal bulb 45 and conduit 46 may form part of an expansible fluid thermostat which is charged with a suitable volatile fluid and responds to changes of temperature of lower evaporator section 12c to operate control device 47, in a manner well-known in the art.

When the temperature of lower evaporator section 12c increases, the thermal bulb 45 becomes effective to operate control device 47 to increase the supply of fuel to burner 15. Under these conditions refrigerant vapor is expelled from solution in generator 10 at an increased rate, thereby increasing the amount of refrigerant vapor which condenses in condenser 11 and flows through conduit 18 into evaporator 12. Conversely, when the temperature of lower evaporator section 12c decreases, the thermal bulb 45 becomes effective to operate control device 47 to decrease the supply of fuel to burner 15. Under these conditions, the rate at which refrigerant vapor is expelled from solution in generator 10 is reduced, thereby decreasing the amount of refrigerant vapor which condenses in condenser 11 and flows through conduit 18 into evaporator 12.

When trays containing water to be frozen are inserted in intermediate and lower evaporator sections 12b and 12c, the load on the evaporator 10 is increased. With such increase in load more refrigerant can evaporate and diffuse into inert gas. Under certain operating conditions, such as, for example, when the room temperature is relatively high and the load on the evaporator is increased in the manner just described, unevaporated liquid refrigerant may not be reaching the bottom coil 38f and the amount of liquid reaching the lower coils may be relatively small. In such case the rate at which ice cubes are produced will be slowed down.

In accordance with this invention, I propose to better this situation by providing a fast freezing evaporator section which will receive liquid refrigerant even when evaporator 12 is under heavy load. With my improvement, when the load on the evaporator is increased, as by the insertion of trays containing water to be frozen, liquid refrigerant is available in such fast freezing evaporator section for rapidly freezing ice cubes and other matter. In the drawings I have diagrammatically shown one way of carrying out the invention.

Instead of arranging coils 38b to 38f in thermal exchange relation with a single shell in the usual manner, I provide separate shells 41 and 42 to form the intermediate and lower evaporator sections 12b and 12c between which the thermal or heat conductive path is reduced or cut down. To the lower end of lower evaporator section 12c is connected a vessel 49 in which liquid refrigerant may accumulate. A drain conduit 50 communicating with an upper part of vessel 49 is provided with a liquid trap 51 and connected to inner conduit 23 of gas heat exchanger 24. When liquid accumulates to a predetermined level in vessel 49, excess liquid drains into the rich gas passage of gas heat exchanger 24. The vessel 49 is arranged in thermal exchange relation with shell 42 and may be considered a part of lower evaporator section 12c.

A conduit 52 connected to a lower part of vessel 49 extends vertically upward and is connected at its upper end to the closed forward end of coil 38a. When the level of liquid in vessel 49 is above the connection of conduit 52, the liquid in the vessel seals the lower end of conduit 52. When the liquid level in vessel 49 falls sufficiently, gas can flow directly from the lowest coil 38f through conduit 52 to coil 32a and by-pass coils 38b, 38c, and 38d.

The rear end of coil 38d is raised at 53, as shown in Fig. 3, to form a dam. By providing such a dam liquid refrigerant flowing downwardly from coil 38a to 38d is prevented from flowing from coil 38d through conduit connection 39' to coil 38f. A conduit 54 connects coil 38d ahead of dam 53 to coil 38e at a region where weak gas enters the latter through conduit 21, as shown in Fig. 3.

During operation of the refrigeration system and when the liquid level in vessel 49 is above the connection of conduit 52 and liquid seals the lower end thereof, inert gas flows successively through coils 38e, 38f, and 38d. From coil 38d inert gas flows through coils 38c, 38b, and 38a. Liquid refrigerant enters through conduit 18 and flows downwardly through coils 38a, 38b, 38c, and 38d in counter-flow to gas which is flowing upwardly through these coils. From coil 38d liquid refrigerant flows through conduit 54 and thence through coils 38e and 38f. In coils 38e and 38f liquid refrigerant is in parallel flow with inert gas entering through conduit 21. With liquid refrigerant and gas flowing in evaporator 12 in the manner just described, with liquid reaching lowest coil 38f and accumulating in vessel 49 to seal the lower end of conduit 52, a refrigerating effect is produced by all of the evaporator sections with the intermediate and lower sections 12b and 12c both effective for freezing ice cubes in the usual manner.

When the liquid level in vessel 49 falls below the connection of conduit 52 and the lower end thereof is no longer sealed by liquid, gas can flow upwardly in conduit 52. The lowering of the liquid level in vessel 49 may be due to an increase in load in intermediate and lower evaporator sections 12b and 12c resulting from insertion of trays containing water to be frozen. With these conditions weak gas enters coil 38e from conduit 21 and flows through this coil and then into bottom coil 38f. From bottom coil 38f gas will now flow upwardly through conduit 52 as well as coils 38d, 38c, and 38b in intermediate evaporator section 12b. The resistance to flow of gas is considerably less in conduit 52 than in the coils in intermediate evaporator section 12b, so that a major portion of the gas will flow from bottom coil 38f through conduit 52 to top coil 38a.

Liquid refrigerant will continue to evaporate and diffuse into inert gas in intermediate evaporator section 12b, but, since the circulation of gas in this evaporator section is reduced considerably due to by-passing of gas in conduit 52, the amount of refrigerant vapor contained in the gas in the intermediate evaporator section will increase. Because of the increase in the partial vapor pressure of refrigerant due to reduced gas circulation, the evaporating temperature of liquid in evaporator section 12b will be increased, whereby less liquid refrigerant will evaporate in this section. Since less liquid will evaporate in intermediate evaporator section 12b with gas flowing upwardly in conduit 52, a greater amount of liquid will reach lower evaporator section 12c.

With the improved arrangement provided, therefore, the flow of liquid refrigerant into lower evaporator section 12c is assured even when the load on evaporator 12 is heavy. The liquid flowing into lower evaporator section 12c is precooled in upper and intermediate evaporator sections 12a and 12b. Likewise, the weak gas flowing into bottom coil 38f is precooled by introduction of liquid refrigerant through conduit 54 into coil 38e into which weak gas flows from conduit 21. Since both the liquid and gas are precooled and bottom coil 38f receives weak gas, my improvement provides a fast freezing evaporator section in the lower part of evaporator 12. In order to maintain as great a mean differential temperature as possible between intermediate and lower sections 12b and 12c, these evaporator sections are arranged in thermal exchange relation with separate shells 41 and 42, as explained above.

When lower evaporator section 12c is acting as a fast freezing portion of the evaporator, gas flowing upwardly through conduit 52 flows through upper coil 38a. The gas by passing intermediate section 12b only flows through one-half of coil 38a since conduit 52 is connected to the forward closed end of this coil.

When the production of ice cubes and the like is hastened in the fast freezing evaporator section 12c, the freezing in intermediate evaporator section 12b is slowed down. When ice has been produced in lower evaporator section 12c and the load on this section is reduced, however, liquid begins to accumulate in vessel 49 whereby the lower end of conduit 52 will be sealed. When this occurs the by-pass conduit 52 is closed and normal circulation of gas will take place in intermediate evaporator section 12b to increase the refrigerating effect produced by this section.

While a single embodiment of the invention has been shown and described, such variations and modifications are contemplated as fall within the true spirit and scope of the invention, as pointed out in the following claims.

What is claimed is:

1. In a refrigerator, an evaporator arranged for continuously downward flow of liquid therein, means for conducting liquid refrigerant to the upper part of said evaporator, means for flowing inert gas to the lower part of said evaporator and withdrawing gas from the upper part of said evaporator so that gas flows upward from one part to another of said evaporator and is in the presence of liquid therein, the upper part of said evaporator being provided with relatively extensive heat transfer surface for cooling air in the refrigerator, an intermediate and also a lower part of said evaporator being arranged to form freezing chambers for ice trays or the like, said evaporator being provided with a conduit for conducting gas from said lower part of the evaporator to said upper part of the evaporator and by-passing said intermediate part, and means to control passage of gas through said conduit responsive to variation in load on said lower evaporator section with respect to rate of flow of liquid into said lower evaporator section, so that upon increase in load on said lower evaporator section with respect to rate of flow of liquid thereto, said conduit is opened to gas flow around said intermediate section and less liquid is evaporated in said intermediate evaporator section making available more liquid for said lower evaporator section in which evaporation takes place at the lowest temperature, thereby providing a fast freezing zone.

2. In a refrigerator, an evaporator as set forth in claim 1 formed by a pipe coil, the upper part of said coil being provided with heat transfer fins, and the intermediate and lower parts being provided with thermally separate casings.

3. A refrigerator as set forth in claim 1 in which the means for controlling said conduit is a liquid trap adapted to hold liquid received from said lower evaporator section in the presence of gas flowing from said section.

HUGO M. ULLSTRAND.